US009167290B2

(12) United States Patent
Zhang et al.

(10) Patent No.: US 9,167,290 B2
(45) Date of Patent: Oct. 20, 2015

(54) CITY SCENE VIDEO SHARING ON DIGITAL MAPS

(75) Inventors: Bo Zhang, Beijing (CN); Ying-Qing Xu, Beijing (CN); Bill P Chen, Redmond, WA (US); Eyal Ofek, Redmond, WA (US); Baining Guo, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 12/971,337

(22) Filed: Dec. 17, 2010
(Under 37 CFR 1.47)

(65) Prior Publication Data

US 2012/0262552 A1 Oct. 18, 2012

(51) Int. Cl.
| | |
|---|---|
| *G11B 27/00* | (2006.01) |
| *H04N 21/4223* | (2011.01) |
| *G06F 17/30* | (2006.01) |
| *H04N 21/258* | (2011.01) |
| *H04N 21/2743* | (2011.01) |
| *H04N 21/422* | (2011.01) |
| *H04N 21/472* | (2011.01) |
| *H04N 21/4788* | (2011.01) |
| *H04N 21/84* | (2011.01) |
| *G11B 27/28* | (2006.01) |

(52) U.S. Cl.
CPC ...... *H04N 21/4223* (2013.01); *G06F 17/30852* (2013.01); *G06F 17/30855* (2013.01); *G11B 27/28* (2013.01); *H04N 21/25841* (2013.01); *H04N 21/2743* (2013.01); *H04N 21/42202* (2013.01); *H04N 21/4788* (2013.01); *H04N 21/47202* (2013.01); *H04N 21/84* (2013.01)

(58) Field of Classification Search
USPC .......................................................... 348/47
See application file for complete search history.

(56) References Cited

U.S. PATENT DOCUMENTS

| | | | |
|---|---|---|---|
| 6,023,241 A | 2/2000 | Clapper | |
| 8,139,817 B2* | 3/2012 | Laganiere et al. | 382/103 |
| 2008/0045138 A1 | 2/2008 | Milic-Frayling et al. | |
| 2011/0034176 A1* | 2/2011 | Lord et al. | 455/450 |

OTHER PUBLICATIONS

Z. Zhang, "Camera Calibration", 2004, Chapter 2, pp. 4-43, in G. Medioni and S.B. Kang, eds., Emergin Topics in Computer Vision, Prentice Hall Professional Technical Reference.*
Turetken E, Alatan A A. Region-based motion-compensated frame rate up-conversion by homography parameter interpolation[C]//Image Processing (ICIP), 2009 16th IEEE International Conference on. IEEE, 2009: 381-384.*
Iocchi "Calibration of Stereo Cameras for Mobile Robots", Jun. 17, 2008.*
Hayman, "Sony Unviels Handycam Camcorder Lineup Loaded With Innovative Technologies", retrieved on Aug. 25, 2010 at <<http://www.sony.ca/view/press_877.htm>>, Sony of Canada Ltd., Press Release, Jan. 7, 2010, pp. 1-2.

(Continued)

*Primary Examiner* — Jay Patel
*Assistant Examiner* — Frank Huang
(74) *Attorney, Agent, or Firm* — Micah P. Goldsmith; Judy Yee; Micky Minhas

(57) ABSTRACT

A video sharing system is described to annotate and navigate tourist videos. An example video sharing system enables non-linear browsing of multiple videos and enriches the browsing experience with contextual and geographic information.

19 Claims, 15 Drawing Sheets

(56) References Cited

OTHER PUBLICATIONS

"Inca X: Real World Mobile Technology", retrieved on Aug. 25, 2010 at <<http://www.incax.com/PDFs/incax_overview.pdf>>, Incax.com, 2010, pp. 1-2.

Marcante, et al., "Social Interaction through Map-based Wikis", retrieved on Aug. 25, 2010 at <<http://www.psychnology.org/File/PNJ6%283%29/PSYCHNOLOGY_JOURNAL_6_3_MARCANTE.pdf>>, PsychNology Journal, vol. 6, No. 3, 2008, pp. 247-267.

Miura, et al., "Nurturing Learners' Communities by Creating and Sharing Maps", retrieved on Aug. 25, 2010 at <<http://www.psychnology.org/File/PNJ6%283%29/PSYCHNOLOGY_JOURNAL_6_3_MIURA.pdf>>, PsychNology Journal, vol. 6, No. 3, 2008, pp. 269-289.

Pongnumkul, et al., "Creating Map-based Storyboards for Browsing Tour Videos", retrieved on Aug. 25, 2010 at <<http://www.juew.org/publication/videoBrowsing.pdf>>, ACM, Proceedings of Symposium on User Interface Software and Technology (UIST), Monterey, California, Oct. 19, 2008, pp. 13-22.

"UAS Video Management System Spot Beam", retrieved on Aug. 25, 2010 at <<http://www.rockwellcollins.com/ecat/gs/UAS_Video_Management_System.html>>, Rockwell Collins, Inc., 2010, pp. 1-2.

\* cited by examiner

CITY SCENE VIDEO SHARING ON DIGITAL MAPS

BACKGROUND

Everyday tourists take and capture video of a trip or experience. Some tourist videos are concerned with capturing people, while other capture layout of a specific location or landscape. After capturing the video, a tourist will often want to annotate the video with text describing landmarks, enabling them to remember the experience. Annotating the video makes it possible for the tourist to share their experience with others interested in the same point of interest. The tourist may also want to remember a specific location or experience captured on video.

Annotating and navigating video may present many obstacles. For example, when a user attempts to annotate a video the labels are static and do not track the landmark throughout the video. Further, a tourist may also have difficulty navigating a video. For example, generally events and locations within a video are presented and stored sequentially. Therefore, if a tourist would like to cue a specific experience or location, the tourist must either play through the entire sequence of the video or fast forward, potentially skipping over other interesting events.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In view of the above, this disclosure describes example methods, systems, and computer-readable media for implementing a process to annotate and navigate a tourist video.

In an example implementation, a video captured by a tourist is uploaded to an annotation and navigation system. The video is split into the numerous frames making up the entirety of the video. The frames are registered to a geo-referenced 3D model, enabling an image from within the frame to be tracked throughout the video. The video is annotated such that a user may select a building from an integrated map application and view a video associated with that building.

A video sharing system is used to annotate and navigate videos. For example, a user may browse multiple videos associated with particular landmarks and/or buildings. The user may then select and view a video, thereby supplementing the browsing experience with additional contextual and geographical information

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical items.

DETAILED DESCRIPTION

A method and process to annotate and navigate tourist videos is described herein. More specifically, the video sharing system enables non-linear browsing of multiple videos and enriches the browsing experience with contextual and geographic information.

Figure 1:
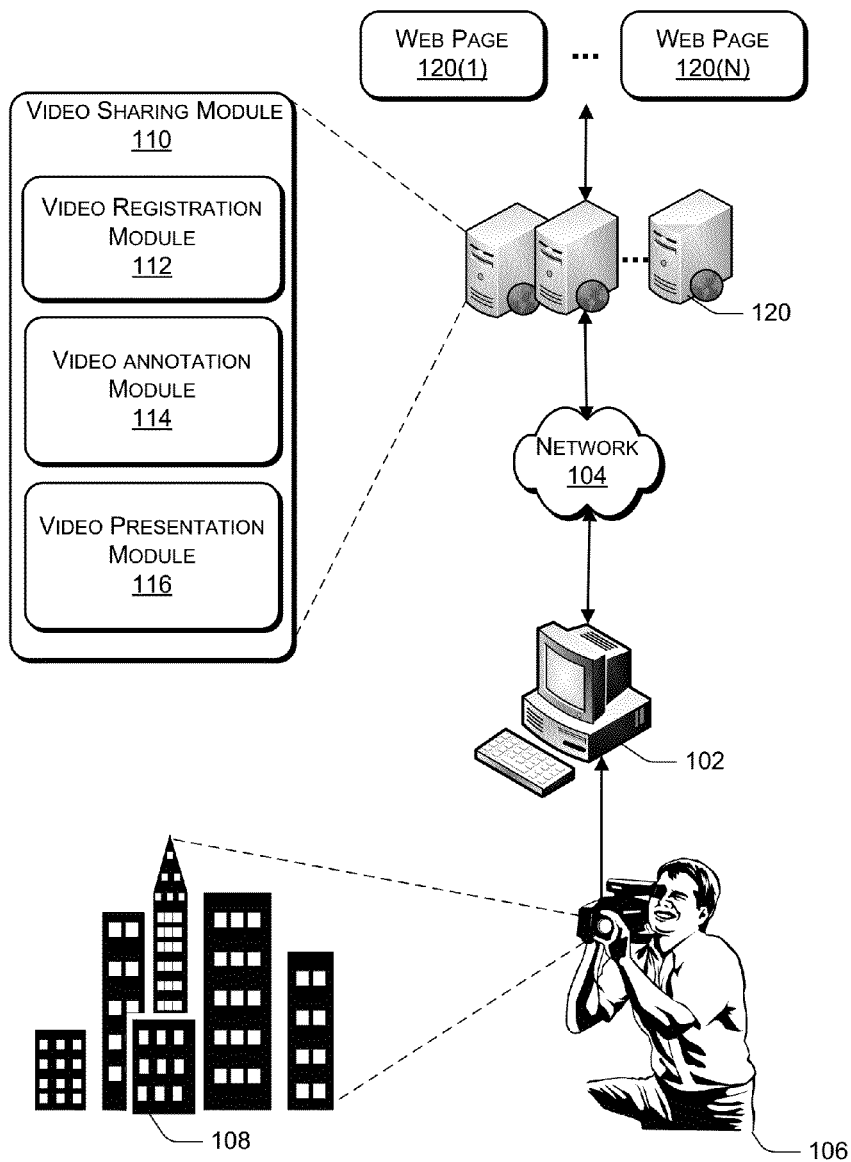
FIG. 1 is a schematic of an illustrative environment for annotation and navigation of tourist videos.

FIG. 1 is a block diagram of an example environment 100, which is used for annotating and navigating tourist videos. The environment 100 includes an example computing device 102, which may take a variety of forms including, but not limited to, a portable handheld computing device (e.g., a personal digital assistant, a smart phone, a cellular phone), a laptop computer, a desktop computer, a media player, a digital camcorder, an audio recorder, a camera, or any other similar device.

The computing device 102 may connect to one or more networks(s) 104 and is associated with a user 106. The network(s) 104 represent any type of communications network(s), including, but not limited to, wire-based networks (e.g., cable), wireless networks (e.g., cellular, satellite), cellular telecommunications network(s), and IP-based telecommunications network(s) (e.g., Voice over Internet Protocol networks). The network(s) 104 may also include traditional landline or a public switched telephone network (PSTN), or combinations of the foregoing (e.g., Unlicensed Mobile Access or UMA networks, circuit-switched telephone networks or IP-based packet-switch networks).

The user may capture a video 108 using any suitable video-capturing device. The video-capturing device may be a digital camcorder, a camera, a smart phone, a cellular phone, or any suitable device. In some instances, the video-capturing device may be equipped with location sensors, such as, without limitation, Global Positioning Systems (GPS), cell tower triangulation, Wi-Fi triangulation, Gyro, Accelerometers, and the like. The location sensors may enable automatic geo-positioning of the video 108 captured on the video capturing device. The user 106 may transfer the video from the video-capturing device to the computing device 102 for additional processing, for example, annotation and navigation.

The computing device 102 enables the user 106 to operate a browser or other client application to interact with a video sharing module 110. The video sharing module 110 may include, without limitation, a video registration module 112, a video annotation module 114, and a video presentation module 116.

The video registration module 114 enables the user 106 to register the video 108 to a geo-reference 3D model such as, without limitation, ArcMap™, PCI Geomatica, or ERDAS Imagine. In one implementation, following registration of the video 108, the video annotation module 116 may access GIS Data to annotate the video 108. The video presentation module 116 enables the video to be presented to the user in an integrated map application.

The video 108 is sent over network(s) 104 to server(s) 118. The server(s) include, without limitation, a multitude of links to numerous (typically in the billions) web pages 120(1)-120(N), possible stored across thousands of machines. Web pages 116(1)-116(N) may be, without limitation, utilized to access the geo-reference 3D-model and/or GIS data used by the video registration model 112 and the video annotation module 114.

Figure 2:
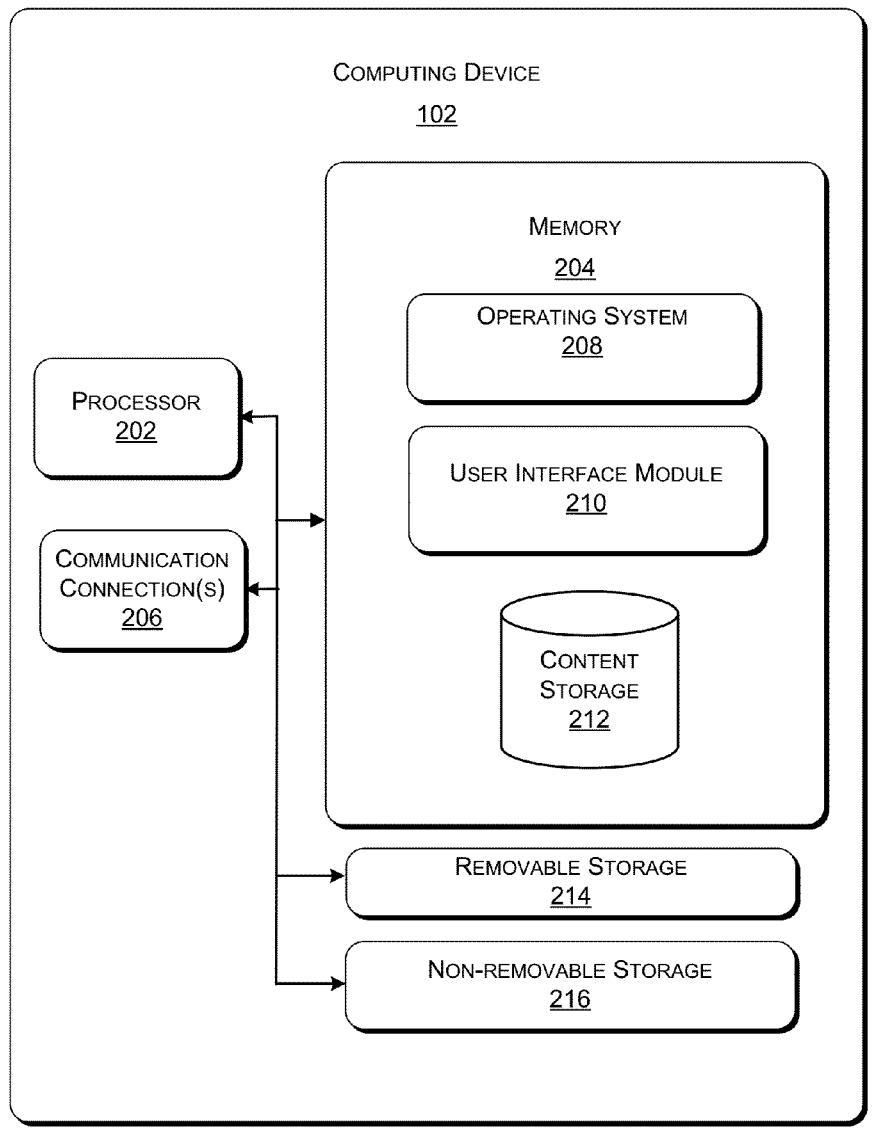
FIG. 2 is a block diagram of an example computing device within the annotation and navigation environment of FIG. 1.

FIG. 2 illustrates an example computing device 102. The computing device 102 includes, without limitation, a processor 202, a memory 204, and one or more communication connections 206. An operating system 208, a user interface (UI) module 210, and a content storage 212 are maintained in memory 204 and executed on the processor 202. When executed on the processor 202, the operating system 208 and the UI module 210 collectively facilitate presentation of a user interface on a display of the computing device 102.

Memory 204 may store programs of instructions that are loadable and executable on the processor 202, as well as data generated during the execution on these programs. Depending on the configuration and type of server, memory 204 may be volatile (such as RAM) and/or non-volatile (such as ROM, flash memory, etc.). The computing device 102 may also include additional removable storage 214 and/or non-removable storage 216 including, but not limited to, magnetic storage, optical disks, and/or tape storage. The disk drives and their associated computer-readable medium may provide non-volatile storage of computer readable instructions, data structures, program modules, and other data for the computing device 102.

Memory 204, removable storage 208, and non-removable storage 210 are all examples of computer storage media. Additional types of computer storage medium that may be present include, but are not limited to, RAM, ROM, flash memory or other memory technology, CD-Rom, DVD, or other optical storage, magnetic cassettes, magnetic tape, magnetic disk storage (e.g., floppy disc, hard drive) or other magnetic storage devices, or any other medium which may be used to store the desired information.

The communication connection 206 may include, without limitation, a wide area network (WAN) interface, a local area network interface (e.g., WiFi), a personal area network (e.g., Bluetooth) interface, and/or any other suitable communication interfaces to allow the computing device 102 to communicate over the network(s) 104.

The computing device 102, as described above, may be implemented in various types of systems or networks. For example, the computing device may be a stand-alone system, or may be a part of, without limitation, a client-server system, a peer-to-peer computer network, a distributed network, a local area network, a wide area network, a virtual private network, a storage area network, and the like.

Figure 3:
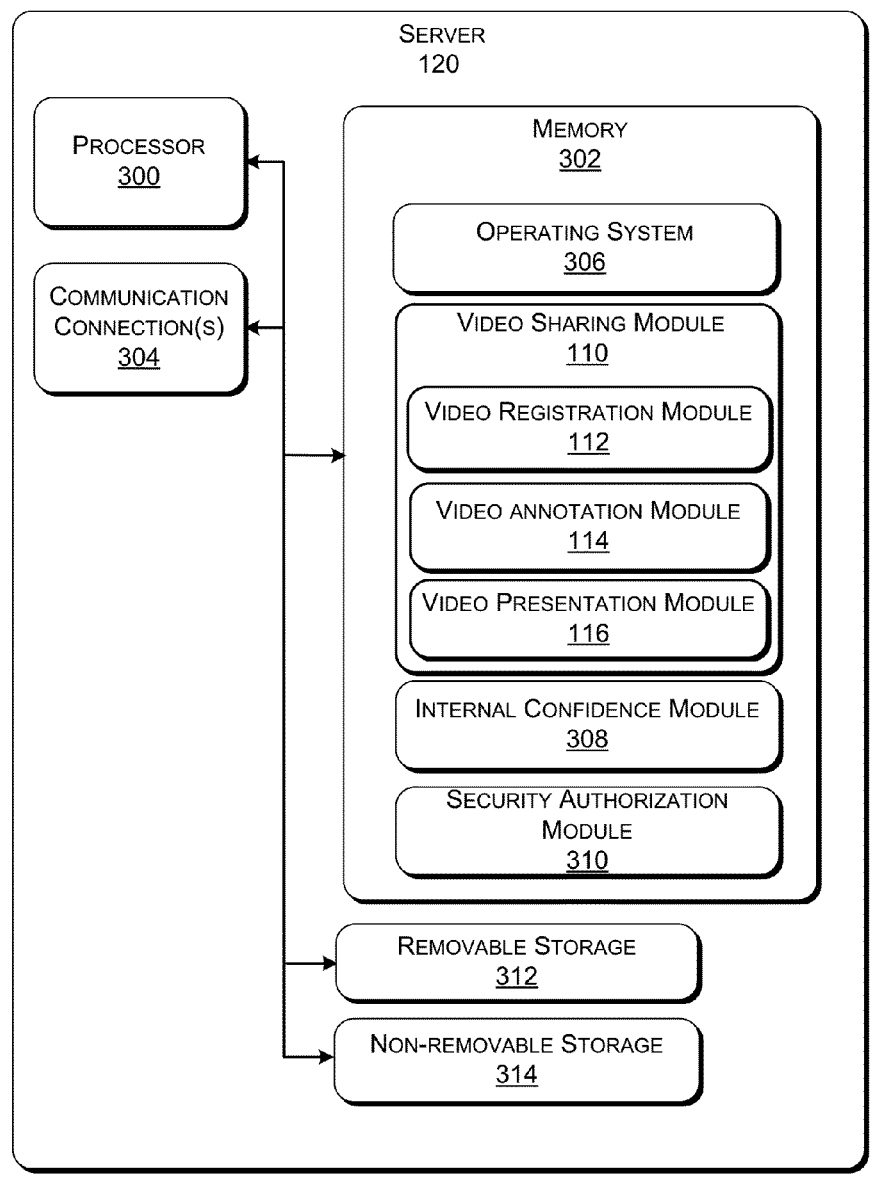
FIG. 3 is a block diagram of an example server within the annotation and navigation environment of FIG. 1.

FIG. 3 illustrates an example server 120. The server 120 may be configured as any suitable system capable of services. In one example configuration, the server 120 comprises at least one processor 300, a memory 302, and a communication connection(s) 304. The communication connection(s) 304 may include access to a wide area network (WAN) module, a local area network module (e.g., WiFi), a personal area network module (e.g., Bluetooth), and/or any other suitable communication modules to allow the 120 to communicate over the network(s) 104.

Turning to the contents of the memory 302 in more detail, the memory 302 may store an operating system 306, the video sharing module 110, the video registration module 112, the video annotation module 114, the video presentation module 116, the internal confidence module 308, and the security authorization module 310.

While the video sharing module 110 is shown to be a component within the server 120, it is to be appreciated that the video sharing module may alternatively be, without limitation, a component within the computing device 102 or a standalone component.

The server 120 may also include additional removable storage 312 and/or non-removable storage 314. Any memory described herein may include volatile memory (such as RAM), nonvolatile memory, removable memory, and/or non-removable memory, implemented in any method or technology for storage of information, such as computer-readable instructions, data structures, applications, program modules, emails, and/or other content. Also, any of the processors described herein may include onboard memory in addition to or instead of the memory shown in the figures. The memory may include storage media such as, but not limited to, random access memory (RAM), read only memory (ROM), flash memory, optical storage, magnetic disk storage or other magnetic storage devices, or any other medium which can be used to store the desired information and which can be accessed by the respective systems and devices.

The server as described above may be implemented in various types of systems or networks. For example, the server may be part of, including but is not limited to, a client-server system, a peer-to-peer computer network, a distributed network, an enterprise architecture, a local area network, a wide area network, a virtual private network, a storage area network, and the like.

Various instructions, methods, techniques, applications, and modules described herein may be implemented as computer-executable instructions that are executable by one or more computers, servers, or computing devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. The functionality of the program modules may be combined or distributed as desired in various implementations. An implementation of these modules and techniques may be stored on or transmitted across some form of computer-readable media.

Figure 4:
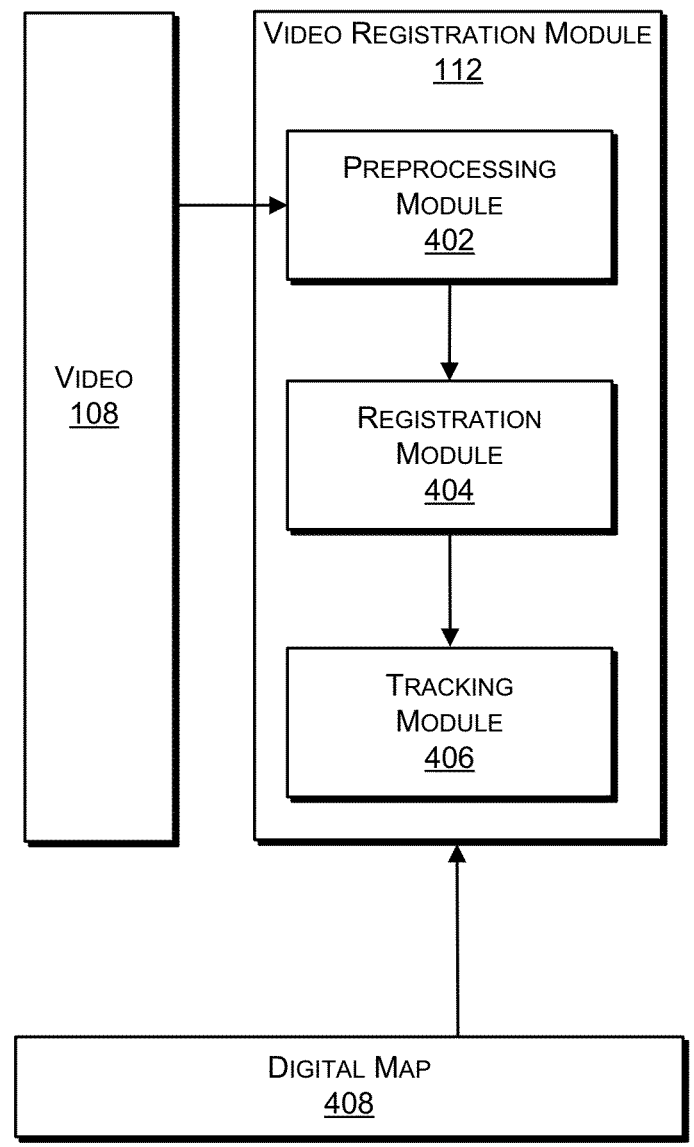
FIG. 4 is illustrative of an exemplary first stage of a video registration process within the annotation and navigation environment of FIG. 1.

FIG. 4 illustrates a first stage of an exemplary process utilized by the video sharing module 110. In one implementation, the video 108 is sent to the video registration module 112. Alternatively, the video 108 may be automatically matched to existing geo-positioned images, for example, street-side images.

The video registration module 112 includes, without limitation, a preprocessing module 402, a registration module 404 and a tracking module 406. In one implementation, the video 108 is a tourist video clip. The tourist video clip may have been captured by the user on a video-capturing device or alternatively the video clip may be downloaded from the World Wide Web (hereinafter "WWW"), and may contain little to no position or orientation information. The preprocessing module 402 receives the video 108. Following receipt of the video, the video is split into one or more shots, wherein a single key frame is specified for each shot. In one implementation, the video may be split into shots manually however, any well known technique for video segmentation may be used. The number of key frames may depend upon the complexity of the shot.

For each key frame, the registration module 404 utilizes an interactive registration tool to align an image within the key frame to a 3D terrain and building model. The 3D terrain and building model may be retrieved from a digital map 408. In one implementation, the image may be overlaid on a 3D view and manually aligned, specifying a correspondence between the 2D features in the image and the 3D features in the model. Alternatively, the registration may be automated by matching key frames to images including a known location and a known orientation.

Figure 5:
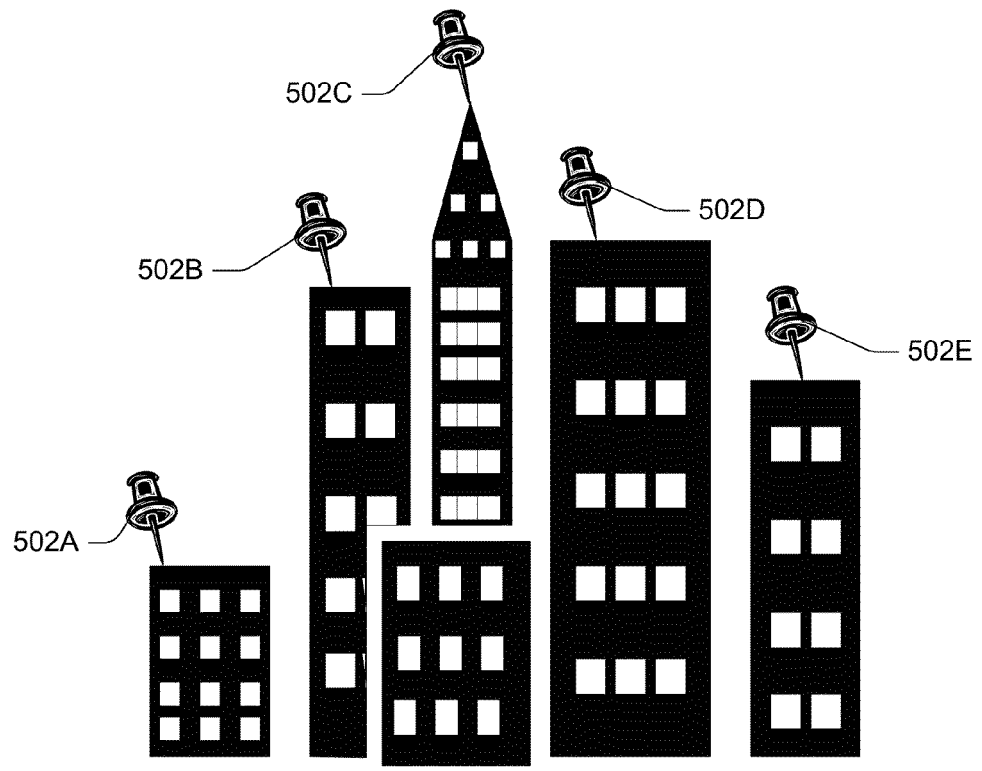
FIG. 5 is an illustrative video frame utilized by the annotation and navigation environment of FIG. 1.

As illustrated in FIG. 5, in one implementation, a set of at least five corresponding pairs of points between the 2D image and the 3D model are used, 502A, 502B, 502C, 502D, and 502E. The 3D view may be created using a virtual camera. The virtual camera may use a camera model that projects the designated points in the 3D world to the designated points on the key frame plane.

In one implementation, a camera may be represented by a camera position, an orientation, and a focal length, represented by Equation (1) below.

$$\begin{bmatrix} f & 0 & 0 \\ 0 & f & 0 \\ 0 & 0 & 1 \end{bmatrix} [R\ t] X = x \qquad \text{Equation (1)}$$

Where f, and R t refer to the camera's focal length, rotation, and translation respectively. X refers to a point in the world and is projected by the camera model to x, a pixel location. By matching a 2D point in the image ($x_i$) and the corresponding 3D point on the model ($X_i$), the user 106 specifies a set of equations. The registration module 404 utilizes the designated points to compute at least an intrinsic camera parameter and an extrinsic camera parameter for that key frame using a non-linear optimization. The intrinsic and extrinsic camera parameters constitute camera calibration parameters and may be calculated for each key frame within each shot of video 108.

The camera calibration parameters are utilized by tracking module 406 to propagate the parameters from each key frame to additional frames in the shot. The calibration may be propagated to nearby frames in both a forward and a backward direction. While the following discussion refers to the forward propagation process, it is to be appreciated that the reverse propagation is conducted in a similar manner.

In one implementation, the propagation occurs iteratively. At each iteration the propagation begins with a reference frame containing known calibration parameters. In the first iteration, the reference frame is the key frame registered by the registration module 404.

Given a reference frame, a search is made to determine a best candidate propagation frame. The search may be done using a temporal search window defined by $[d_{min}, d_{max}]$. If k represents the reference frame position, then for each fame inside $[k+d_{min}, k+d_{max}]$, a score for propagation is computed. $d_{min}$ prevents propagation from clumping near the reference frame and $d_{max}$ prevents propagating too far.

Figure 6:
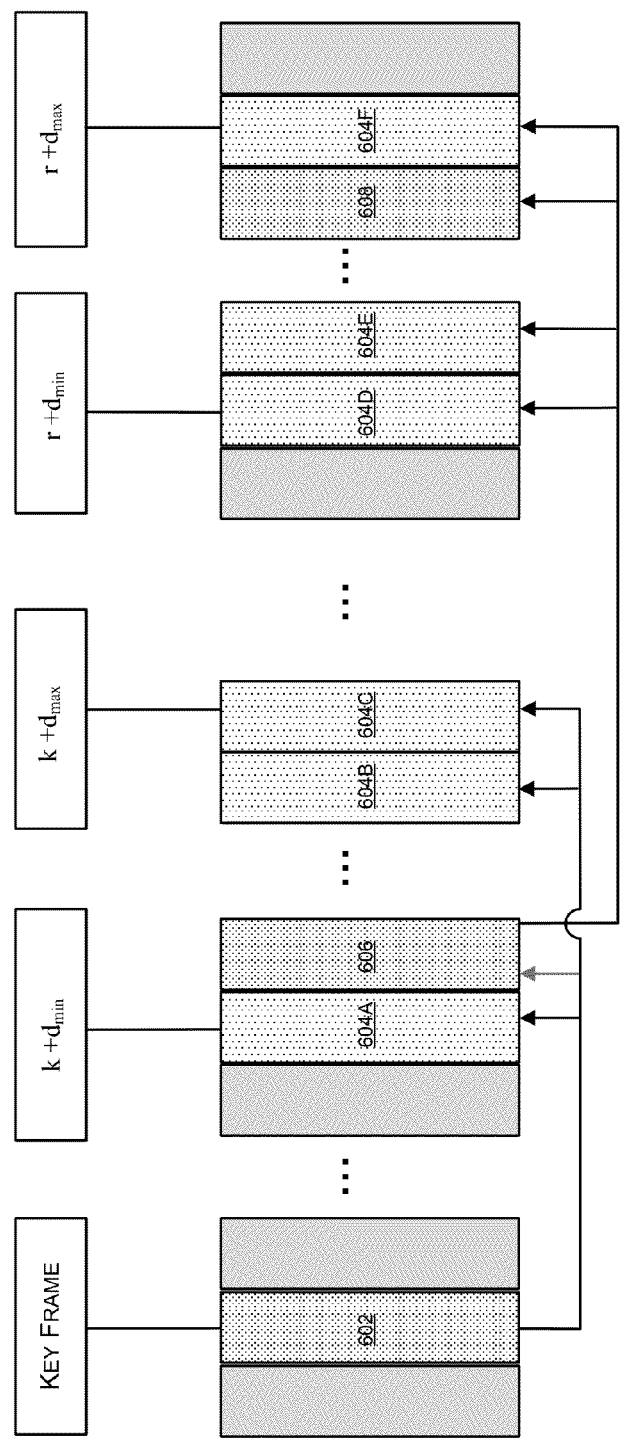
FIG. 6 is an illustrative iterative process used by the annotation and navigation environment of FIG. 1.

FIG. 6 illustrates the search process for two iterations. During the first iteration, the reference frame is the key frame k, shown as frame 602, and the candidate frames are 604A, 604B, and 604C, and 606. The best candidate frame r, is shown as frame 606. During the second iteration, the search is in a new window (604D, 604E, 604F, and 608) to find the next reference frame 608.

To determine the best candidate propagation frame, a score is assigned to each candidate frame, enabling a 2D correspondence between the reference frame and the candidate frame. This correspondence, along with the reference calibration parameters determined above may be used to establish a 3D to 2D correspondence in the candidate frame.

Figure 7:
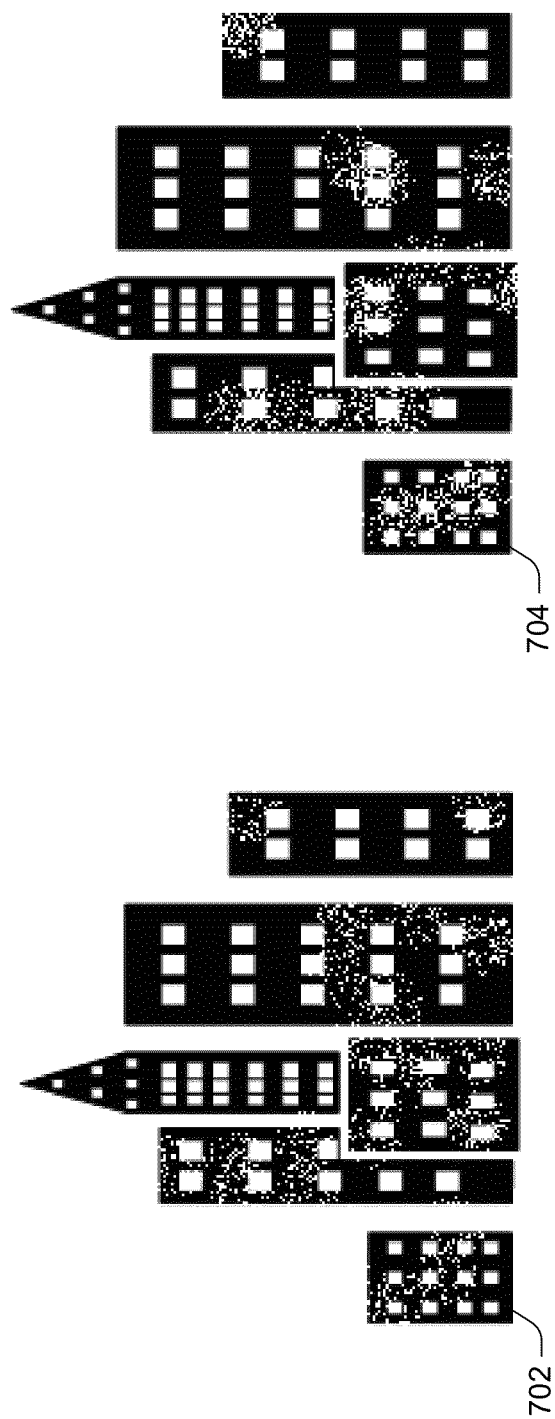
FIG. 7 is an illustrative reference video frame and candidate video frame utilized by the annotation and navigation environment of FIG. 1.

As illustrated in FIG. 7, the 2D correspondence may be determined by extracting the scale-invariant feature transform (SIFT) from the reference frame 702 and the candidate frame 704. The visible 3D building models may then be projected onto the frame and a distance to transform every building projection to mark edge pixels in the image may be calculated. Only visible SIFT features that do not project near occlusion edges are kept for matching. In one implementation, the remaining SIFT features may be matched to the candidate frame by using an approximate nearest neighbor calculation followed by a random sample consensus method. Using the reference frame 702, each 2D feature with a corresponding location in the 3D scene may be back projected using the reference frames calibration parameters. Given a pair of points consisting of a 3D location and the corresponding 2D feature in the candidate frame, the candidate frames calibration may be calculated using a non-linear optimization method over the camera calibration parameters discussed above. The resulting score for the candidate frame is the re-projection error using candidate camera calibration.

Once a score for each candidate frame has been determined the candidate frame with the highest score is stored for use in the next iteration of the propagation method. The iterations may be concluded when the end of the video is reached. In one implementation, the calibration for the remaining frames may be calculated by interpolating the nearby camera parameters, ultimately resulting in a video 108 where all of the frames are calibrated.

Figure 8:
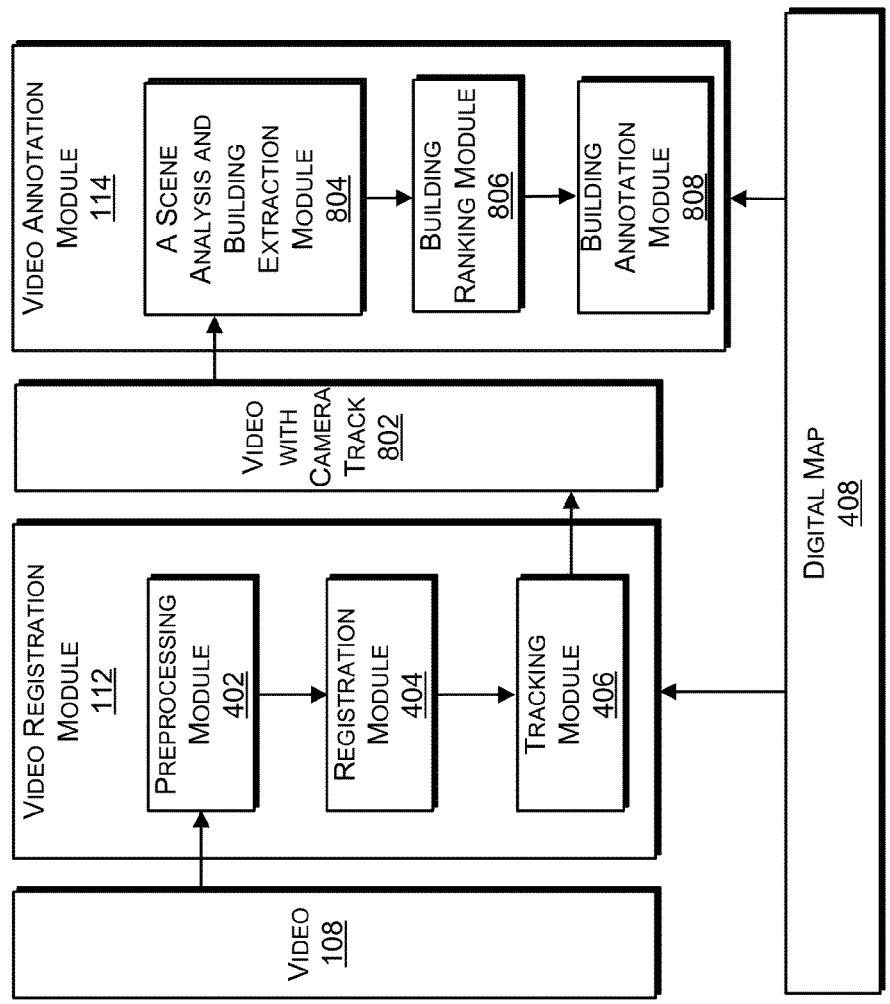
FIG. 8 is illustrative of an exemplary first and second stage of a video registration process within the annotation and navigation environment of FIG. 1.

FIG. 8 illustrates a second stage of an exemplary process utilized by the video sharing module 110. The video annotation module 114 receives the video including camera tracking information 802 determined in the first stage of the process described above. In one implementation, the video annotation module 114 includes, without limitation, a scene analysis and building extraction module 804, a building ranking module 806, and a building annotation module 808.

In one implementation, once a video is calibrated it may be annotated with semantic content. More specifically, each pixel is assigned a label referring to semantic information such as landmark information, anecdotes, and the like. The annotated labels may be used to enrich the video. However, projecting all of the potential landmark information results in an image with a clutter of labels. To reduce the clutter, the scene analysis and building extraction module 804 calculates a score for each of the buildings and utilizes that score to schedule the annotations in time, for example, across frames, and space, for example, in the frame.

The score of each of the buildings are computed for every frame of the video. A low score at a particular frame means that the building is unimportant at that time. The scoring function $S_f(b)$ at frame f for a building b may be defined as:

$$S_f(b) = \alpha_p P(b) * \alpha_r R(b) \quad \text{Equation (2)}$$

where P is a function describing the building's projection area within frame f. R is a function describing the buildings proximity to a region of interest in the frame. The term P describes the building's projection area in a frame. A large area means the building is important. This however, penalizes buildings that are a long distance away. Therefore, a bias term, log(d), where d is the depth of an anchor point of the building, is added to increase a score of a building that is further away. The anchor point is generally the center of the building. The definition of P is:

$$P(b) = \log(d)p(b) \quad \text{Equation (3)}$$

where p(b) is the building's projected area.

The term R measures the distance between a building's anchor point and the region of interest (ROI). The ROI is generally a window in the center of the frame. A building may receive a higher score if the anchor point for the building is close to the ROI. If the ROI is parameterized by a 2D center point r, and a defines the 2D projection of the building's anchor point, the definition of R is:

$$R = d_M - \|a - r\| \quad \text{Equation (4)}$$

where $d_M$ is a predefined maximum distance.

Figure 9:
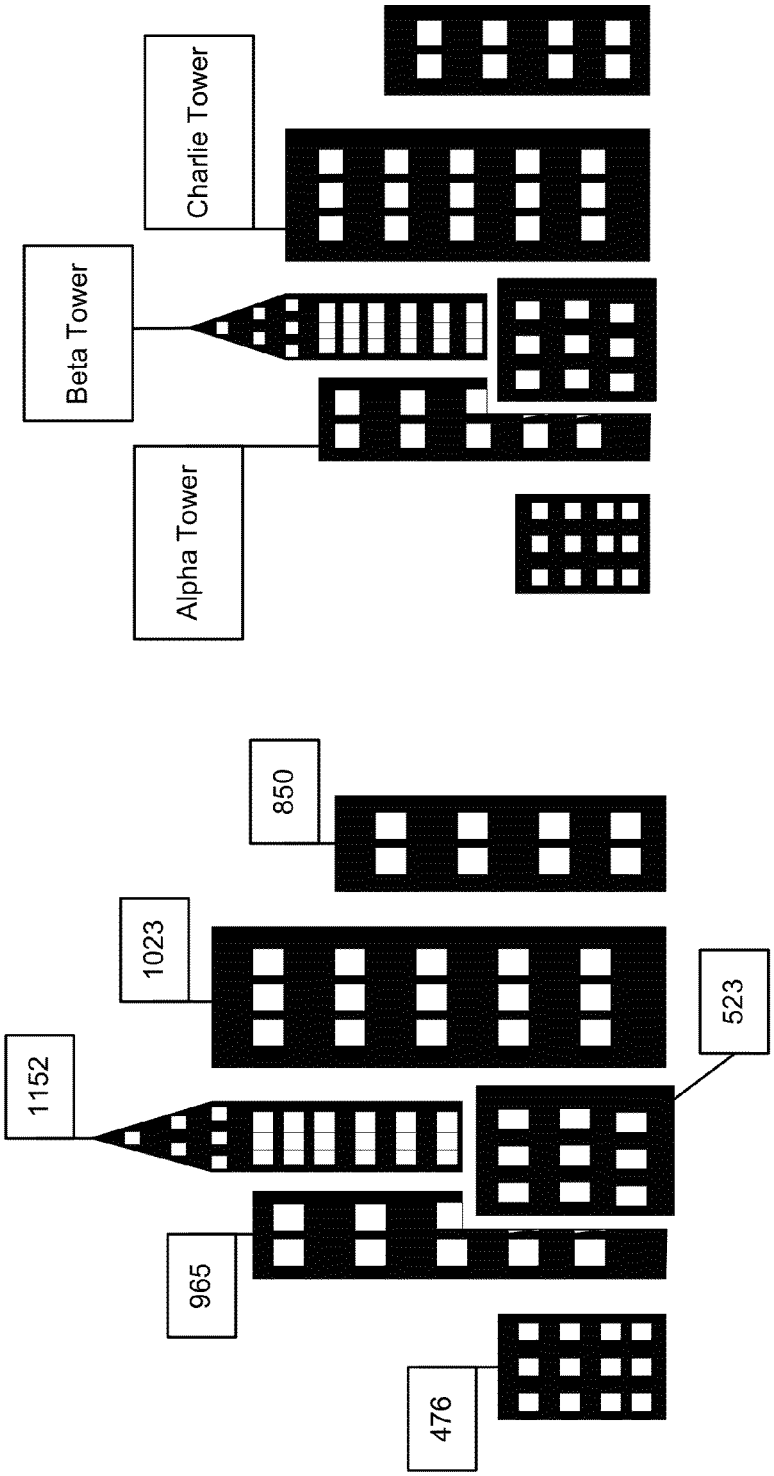
FIGS. 9A and 9B are illustrative video frames utilized by the annotation and navigation environment of FIG. 1.

FIG. 9A illustrates scores for buildings in a frame. In one implementation, the scores shown in FIG. 9 match the visual importance of the buildings within the frame. As soon as a score has been determined for each building within the frame, a lifetime of a building may be defined as a set of frames in which the building has a non-zero score. Buildings may be removed that have a lifetime shorter than a predetermined time span.

The building ranking module 806 utilizes a dynamic programming algorithm to schedule when and where to display each annotation for each building. The dynamic programming algorithm schedules n annotations in 1-second video sequences. In one implementation, the building ranking module 806 utilizes a linear mapping from a score of the building to the lifetime length of the building, enabling the building with the highest score to remain in the video the longest.

In some instances, annotations are scheduled in increments of seconds, where at most m annotations are allowed in any given second. The dynamic programming algorithm attempts to maximize the sum of the scores of all the scheduled annotations through the associated building lifetime by utilizing a top-down approach of dynamic programming Utilizing this top-down approach, determining when and where to display each annotation for each building becomes a scheduling issue that may be formulated as scheduling all of the n annotations given in the initial state of {m, m, . . . , m}, when all of the m slots of every second of the video are available.

In this top-down approach, a state may be defined to be as the number of annotation slots available in every second of the video. Furthermore, this top-down approach may be used to schedule the last k annotations within any given state. For example, a first annotation may be examined and a set of possible insertion positions are determined according to the current state. The programming algorithm may discard an insertion or schedule it somewhere by maximizing the sum of the score of this annotation and the optimal score. If an annotation is discarded, the sate remains the same. Alternatively, for each second the annotation occupies, the number of available slots decreases by one. The dynamic programming algorithm repeats until there are no more annotation slots are available.

An example pseudo-code representing the dynamic programming algorithm is:

```
SCHEDULER (k, state, [out]score, [out]policy)
 1      if k = 0
 2          then score ← 0
 3              policy ← EmptyList
 4              return
 5      if MEMORIZED (k, state, [out]score, [out]policy)
 6          then return
 7      SCHEDULER (k−1, state, [out]score, [out]policy)
 8      policy.Add(−1) // annotation is discarded
 9      for i←0 to l−d
10      do if SLOT-AVAILABLE (i, state)
11          then state' = STATE-TRANSITION (i, state)
12              SCHEDULER (k−1, state',
13                  [out]score', [out]policy')
14              score' = score' + Scores [n−k, i]
15              if score' > score
16                  then score=score'
17                      policy = policy'.Add(i)
18      MEMORIZE (k, state, score, policy)
```

If the maximum number m is too large, more than one pass may be run through the dynamic programming algorithm. In each pass, a smaller number of simultaneous annotations are allowed. Unscheduled annotations are processed in the next pass until m simultaneous annotations are reached.

As illustrated in FIG. 9B, once annotations have been scheduled in each frame of the video 108, the frames are laid out spatially, with the annotations in the top area of each frame. Each annotation is then connected to the associated building's anchor point using the building annotation module 808.

Figure 10:
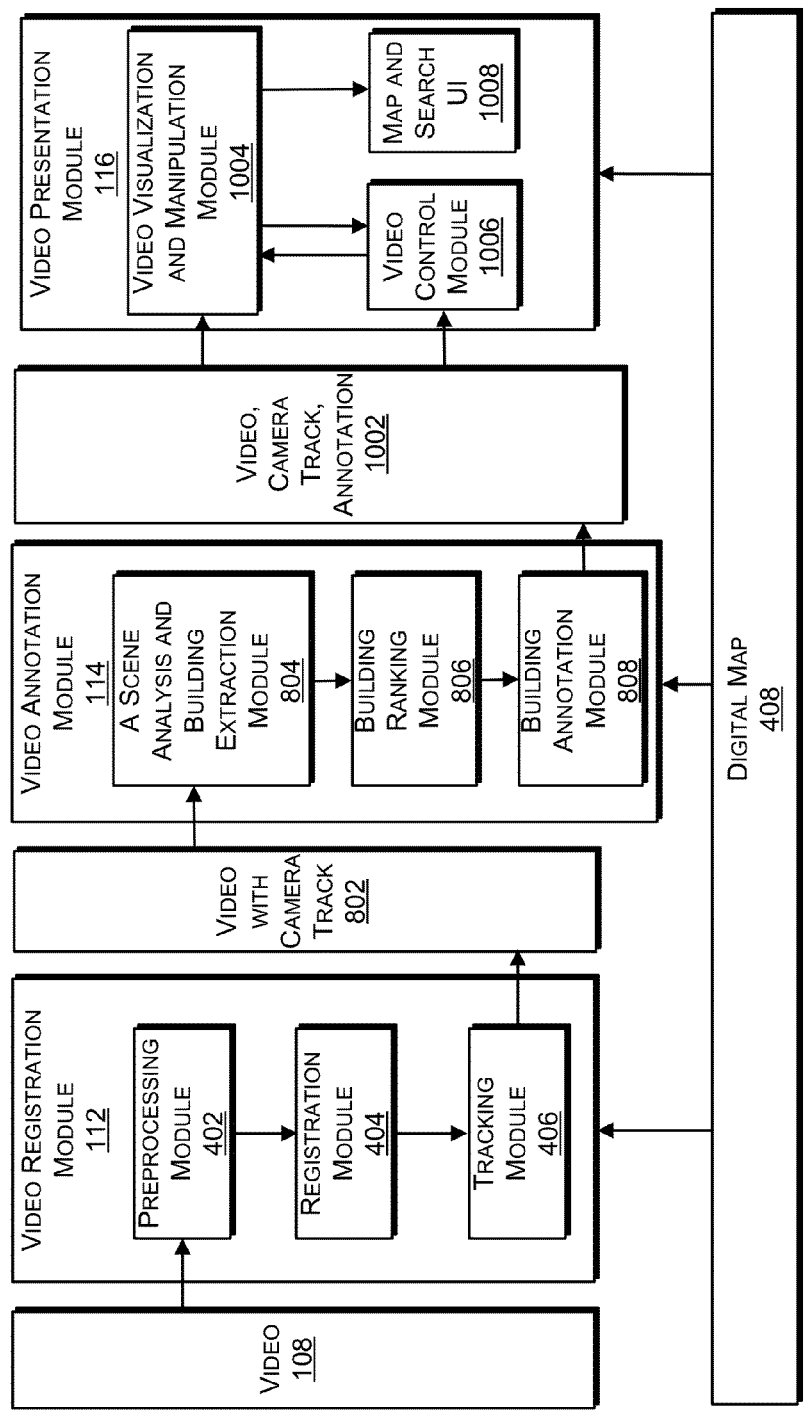
FIG. 10 is illustrative of an exemplary first, second, and third stage of a video registration process within the annotation and navigation environment of FIG. 1.

FIG. 10 illustrates a third stage of an exemplary process utilized by the video sharing module 110. The video presentation module 116 receives the video including camera tracking information and annotation 1002 determined in the first and second stages of the process described above. In one implementation, the video presentation module 116 includes, without limitation, a video visualization and manipulation module 1004, a video control module 1006, and a map and search user interface (UI) 1008.

The video visualization and manipulation module 1004 to present an integrated map application to the user 106. The video control module 1006 enables the user to manipulate the video 108 as needed. For example, the user may update the camera position and frustum while the video is playing. The video 108 may also be sped up or slowed down.

Figure 12:
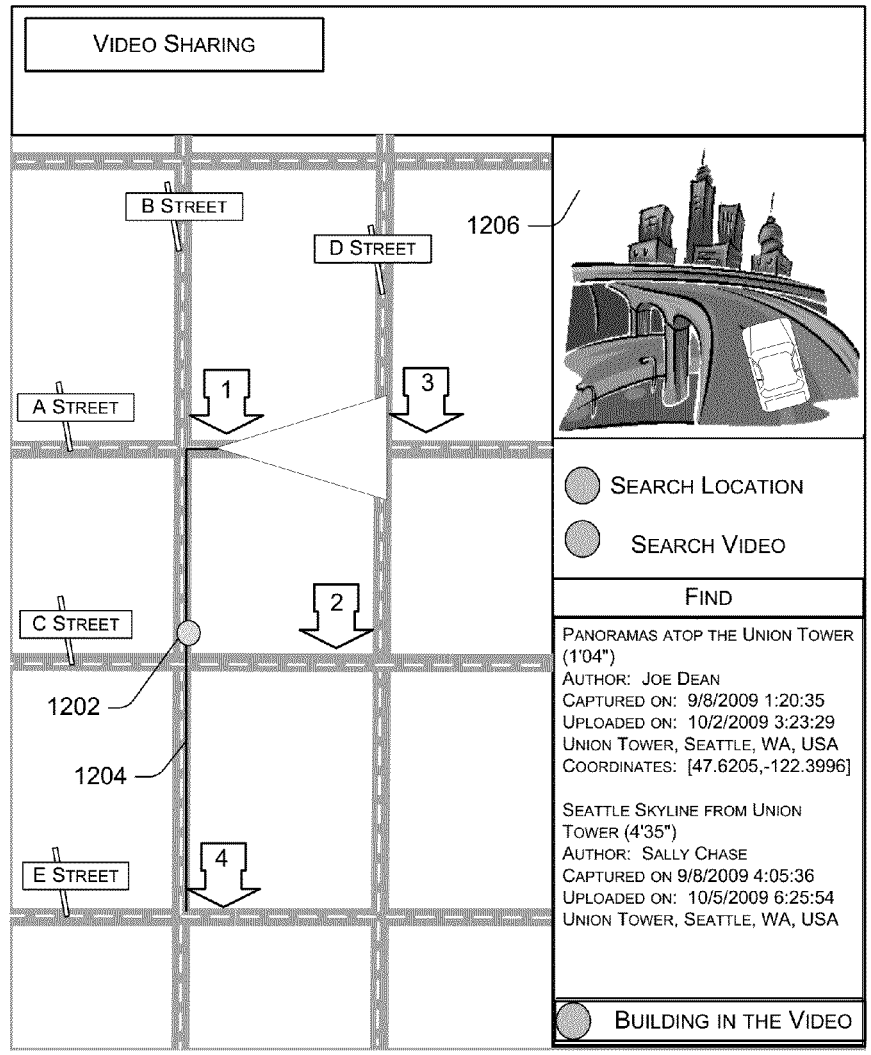
FIG. 12 is an illustrative navigation of the video with the annotation and navigation environment of FIG. 1.
Figure 13:
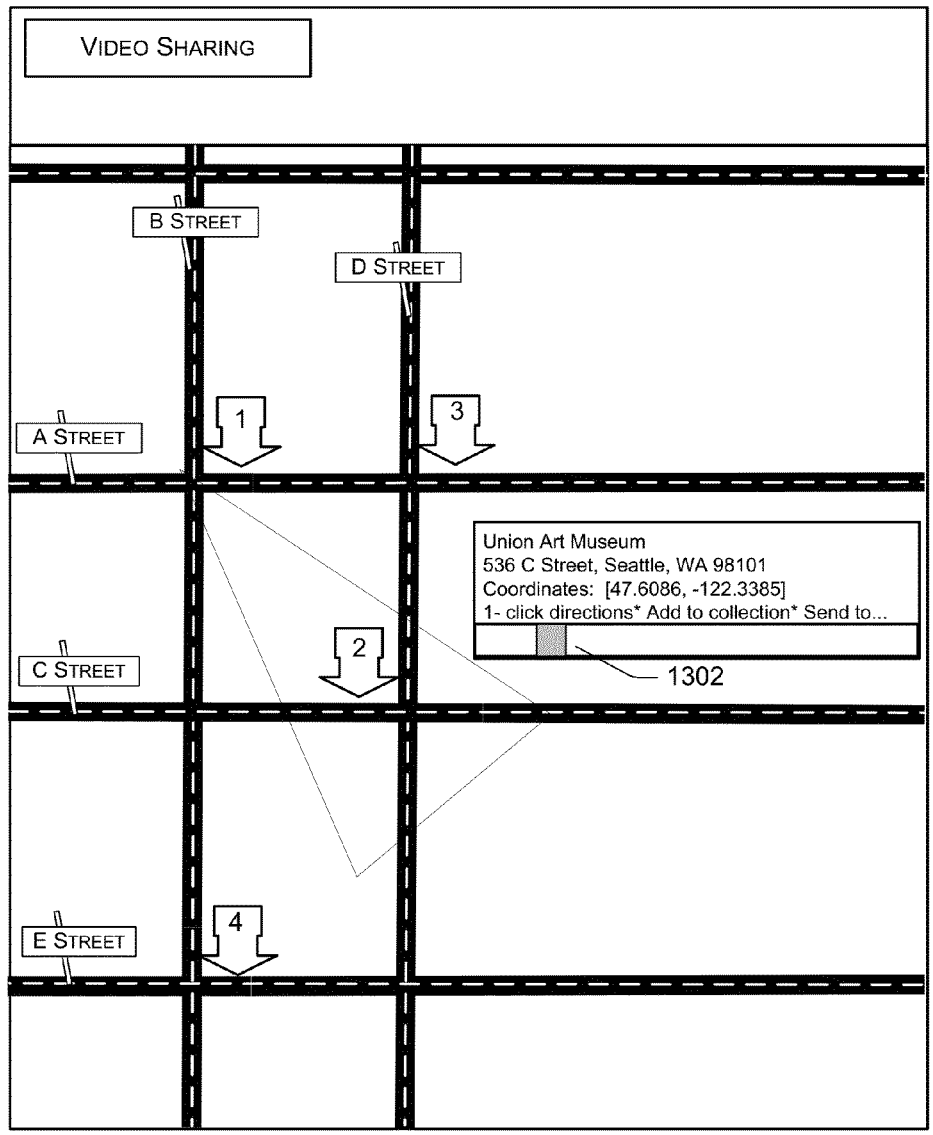
FIG. 13 is another illustrative navigation of the video with the annotation and navigation environment of FIG. 1.
Figure 14:
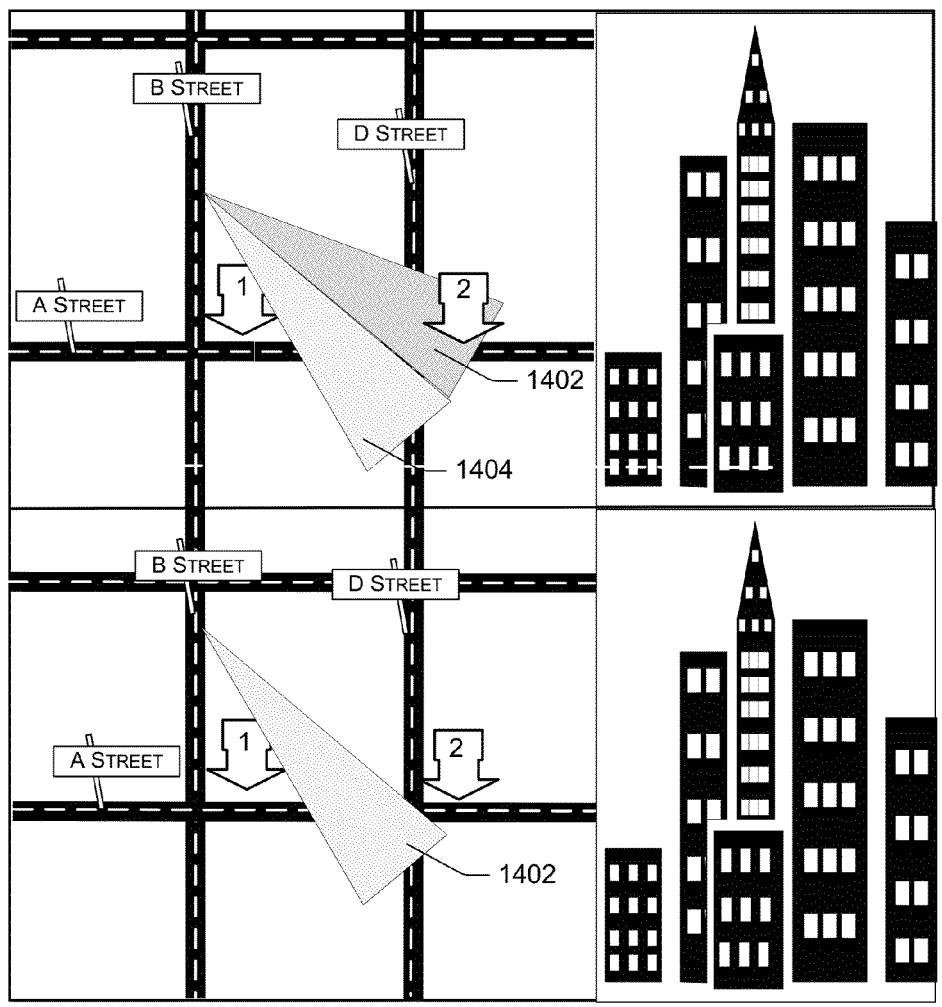
FIG. 14 is another illustrative navigation of the video with the annotation and navigation environment of FIG. 1.

The map and search UI 1008 enables the user to navigate the video 1002. In one implementation, there are at least five ways to navigate video 1002; (1) play the video sequentially, (2) drag along the video trajectory on the map, (3) play the video within the lifetime of an annotation, (4) find the video frame that contains a building requested during a query, or (5) find the video frame that matches a query frustum. An exemplary illustration of the first mode is shown in FIG. 12. As illustrated, a navigational point 1202 may be dragged along a trajectory 1204, displaying a highlighted portion in 1206. An exemplary implementation of the second mode is illustrated in FIG. 13. As illustrated, the lifetime of a building may be displayed in continuum 1302. An exemplary illustration of mode three is shown in FIG. 14. As illustrated in FIG. 14, the user 106 may drag a highlighted portion 1402, to generate a query frustum 1404. In one example, if the user generates the query frustum using a mouse, when a mouse button is released, the query is submitted. A search would look for a visible area within a video frame that best matches the query frustum 1404.

The first three modes may play the video sequentially. The second mode enables the user 106 to quickly scan through the video by scrubbing along the video trajectory. The third mode specifically enables the user to play a video cliplet that only shows a particular annotation.

Modes 4 and 5 enable the user 106 to quickly jump to a position in the video 108. For example, in one implementation, the user can specify a building by clicking on a building thumbnail presented on a map. The video 108 may then jump to a frame within the video 108 where that building contains the highest score. Alternatively, the user 106 may specify a query frustum and the video 108 may jump to a frame with the closest result to the query input by the user.

The user 106 may also add annotations on a building by clicking on that building within the video 108. The video sharing module 110 may then convert the 2D click into a ray using the current frame's calibration. This ray is intersected with the geo-referenced geometry to find the target building. Once found, the building may be added to the annotations on the map.

Figure 11:
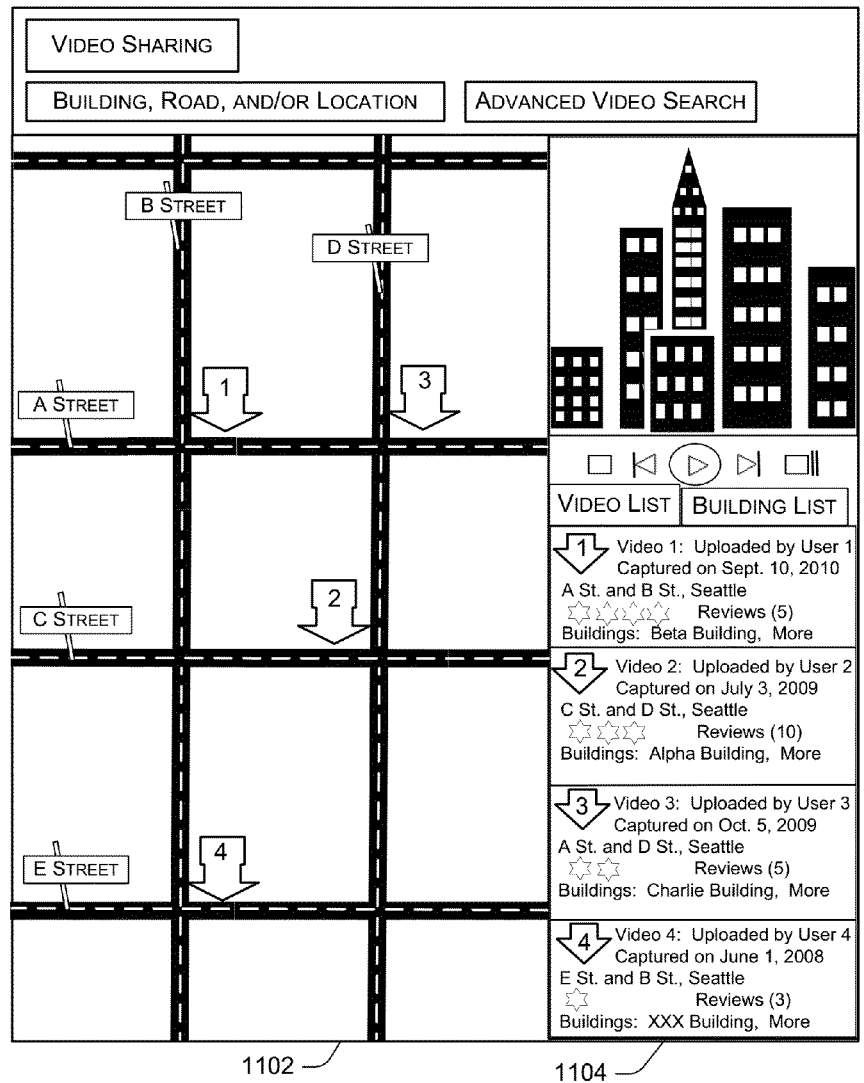
FIG. 11 is an illustrative integrated map application for use with the annotation and navigation environment of FIG. 1.

FIG. 11 illustrates an exemplary interactive map application. In one implementation, the user may either search by building, and/or location, or search using the advanced video search. If for example, the user 106 enters Beta Building, Seattle, the user may be presented with an interactive map similar to that shown 1102. The map may contain street names as well as other landmarks within the general vicinity of the desired building. The building may be represented by an icon. The icon may be a number, a letter, a symbol or a thumbnail of the associated building. A corresponding icon may also be available in toolbar 1104. In one implementation, the user may be presented with the exact location, a review of the video associated with the building, a rating system, and the like.

While specific advantages are discussed above, it is to be appreciated that the advantage of utilizing the video sharing module 110 may be numerous and are not limited to those examples discussed above.

Figure 15:
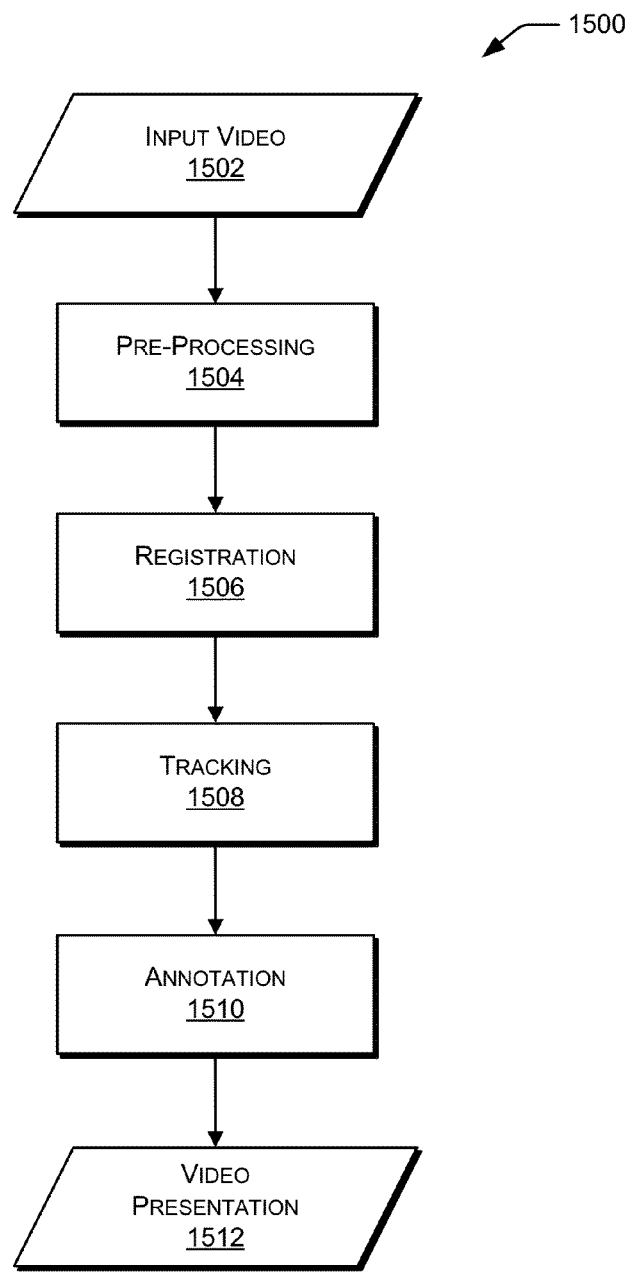
FIG. 15 is a flow chart of an example use outlining the annotation and navigation process within the environment of FIG. 1.

FIG. 15 illustrates an example process 1500 outlining for annotating and navigating tourist videos set forth above. In the flow diagram, the operations are summarized in individual blocks. The operations may be performed in hardware, or as processor-executable instructions (software or firmware) that may be executed by one or more processors. Further, the process 1500 may, but need not necessarily, be implemented using the framework of FIG. 1.

At block 1502, a video 108 is input into the video sharing module 110. At block 1504, the preprocessing module 402 receives the video 108. Following receipt of the video, the video is split into one or more shots, further specifying a single key frame for each shot.

At block 1506, the registration module 404 registers the video 108 to a geo-referenced 3D model. For example, the registration module may utilize an interactive registration tool, enabling an image from within video 108 to be overlaid on a 3D terrain and building model, generating camera calibration parameters stored for later use by the video sharing module 110.

At block 1508, the tracking module 1406 uses the camera calibration parameters determined for one frame in the video 108 to propagate the parameters to additional frames in the shot. The propagation may be an iterative process. The process may determine a best candidate propagation frame for each iteration within the process.

At block 1510, the video may be annotated with semantic content. Each annotation is scheduled in each frame of the video and laid out spatially within the video. Each annotation is connected to the associated building within the video. At block 1512, the video, camera track, and annotation may be presented to the user in an integrated map application. The user may navigate the interactive map, selecting an icon associated with a particular building or location. The icon may be, without limitation, a number, a letter, a symbol, a thumbnail of the building, or the like. Selection of the icon presents the user with a video associated with that particular icon.

CONCLUSION

Although a process for annotating and navigating tourist videos has been described in language specific to structural features and/or methods, it is to be understood that the subject of the appended claims are not necessarily limited to the specific features or methods described. Rather, the specific features and methods are disclosed as example implementations.

What is claimed is:

1. A system comprising:
   a memory;
   one or more processors coupled to the memory;
   one or more modules stored in the memory and operable on the one or more processors to:
   generate camera calibration parameters used to calibrate a video and produce a calibrated video;
   align a designated 2-dimensional (2D) feature in at least one key frame of a shot in the calibrated video to a designated 3-dimensional (3D) feature of a 3D terrain and building model retrieved from a digital map;
   propagate the camera calibration parameters from the at least one key frame to one or more additional frames in the shot by at least matching features depicted in the at least one key frame and an additional frame of the one or more additional frames;
   calculate propagated camera calibration parameters continuously for additional frames based on the camera calibration parameters of a 2D image in the at least one key frame and correspondence of the features in the additional frame to points in the 3D terrain and building model using non-linear optimization;
   determine a candidate frame for the shot based on a score assigned to the candidate frame, the score being determined by:
   extracting a scale-invariant feature transform (SIFT) from a reference frame and the candidate frame;
   projecting designated 3D features onto the reference frame, keeping visible SIFT features that do not project near an occlusion edge for matching; and
   matching the visible SIFT features to the candidate frame using an approximate nearest neighbor calculation;
   annotate one or more buildings depicted within the calibrated video with semantic content; and
   present, via a map application, the one or more annotated buildings within the calibrated video utilizing one or more interactive viewing options.

2. The system of claim 1, wherein the one or more modules further comprise a preprocessing module that receives the video and splits the video into one or more shots, each of the one or more shots comprising at least one key frame.

3. The system of claim 1, wherein the one or more modules are further executable on the one or more processors to propagate the camera calibration parameters iteratively.

4. The system of claim 1, wherein the one or more modules further comprise at least one of:
a scene analysis and building extraction module that calculates a score for an individual building in the calibrated video, the score used to schedule an annotation of the individual building across one or more frames;
a building ranking module that utilizes a dynamic programming algorithm to schedule when and a duration in the calibrated video in which to display at least one annotation for the individual building; or
a building annotation module that connects an annotation to an anchor point of an associated building.

5. The system of claim 4, wherein the score for the individual building is computed for multiple frames of the calibrated video, wherein the score indicates a visual importance of the building within the multiple frames.

6. The system of claim 5, wherein a lifetime of the individual building may be defined as a set of frames in which the individual building has a non-zero score, and wherein the building ranking module is further executable on the one or more processors to remove the individual building from the calibrated video that has a lifetime shorter than a predetermined time span.

7. The system of claim 4, wherein the building ranking module is further executable on the one or more processors to use a top-down approach to maximize a sum of the scores of a plurality of annotations for an associated lifetime of a building to schedule when and where in the calibrated video to display the at least one annotation.

8. The system of claim 1, wherein the calibrated video includes a tourist video clip with no position information or orientation information.

9. A computer-implemented method, comprising:
aligning a 2-dimensional (2D) image in one or more key frames of a video to a 3-dimensional (3D) terrain and building model retrieved from a digital map based on multiple corresponding pairs of points between the 2D image and the 3D terrain and building model such that a designated 2D feature in the one or more key frames is aligned to a designated 3D feature of the 3D terrain and building model;
computing camera calibration parameters using the designated 2D feature and the designated 3D feature;
generating a calibrated video by propagating the camera calibration parameters by the one or more key frames of the calibrated video to one or more additional frames in the calibrated video and to a candidate frame in at least one shot of the video, the candidate frame being selected based at least in part on a score assigned to the candidate frame, the score being determined by:
extracting a scale-invariant feature transform (SIFT) from a reference frame and the candidate frame;
projecting the designated 3D features onto the reference frame, keeping visible SIFT features that do not project near an occlusion edge for matching; and
matching the visible SIFT features to the candidate frame using an approximate nearest neighbor calculation;
calculating propagated camera calibration parameters continuously for the one or more additional frames based on the camera calibration parameters of the 2D image and correspondence of the SIFT features in the additional frame to points in the 3D terrain and building model using non-linear optimization;
interpolating additional camera calibration parameters for one or more remaining frames of the calibrated video from the camera calibration parameters;
annotating one or more buildings depicted within the calibrated video with semantic content; and
presenting corresponding icons for the one or more annotated buildings within the calibrated video, where the corresponding icon is selectable to display a shot included in the calibrated video that depicts a corresponding annotated building, utilizing one or more interactive viewing options.

10. The computer-implemented method of claim 9, wherein the annotating includes:
calculating a score for an individual building depicted in the calibrated video based at least on a proximity of the individual building to a region of interest in a frame and a projection area of the individual building in the frame; and
scheduling when and a duration in the calibrated video in which to display at least one annotation for the individual building based at least in part on the score.

11. One or more computer-readable storage devices storing computer-executable instructions that are executable to cause one or more processors to perform acts comprising:
computing camera calibration parameters based on a 2-dimensional (2D) image in a key frame of a video and a 3-dimensional (3D) terrain and building model;
generating a calibrated video by propagating camera calibration parameters of the 2D image in the key frame to one or more additional frames in the video, the one or more additional frames in the video including a candidate frame, the candidate frame being selected based at least in part on a candidate frame score, the candidate frame score being determined by:
extracting a scale-invariant feature transform (SIFT) from a reference frame and the candidate frame;
projecting a 3D feature onto the reference frame, keeping visible SIFT features that do not project near an occlusion edge for matching; and
matching the visible SIFT features to the candidate frame using an approximate nearest neighbor calculation;
annotating one or more buildings depicted within a frame of the calibrated video with semantic content;
calculating a score for a building depicted in the calibrated video based at least on a proximity of the building depicted in the frame to a region of interest in the frame and a projection area of the building depicted in the frame;
building a model using non-linear optimization so that the one or more additional frames have the camera calibration parameters; and
scheduling when and a duration in the calibrated video in which to display one or more annotations for the building based at least on the score, utilizing one or more interactive viewing options.

12. The one or more computer-readable storage devices of claim 11, wherein the acts further comprise presenting a corresponding icon for at least one of the one or more annotated buildings within the calibrated video, an individual icon is selectable to display a shot included in the calibrated video that depicts a corresponding annotated building.

13. The system of claim 1, wherein the one or more modules are further executable on the one or more processors to present a corresponding icon for an individual of the one or more annotated buildings within the calibrated video, an individual icon being selectable to display a shot included in the calibrated video that depicts a corresponding annotated building.

14. The computer-implemented method of claim 9, wherein the propagating is done iteratively.

15. The computer-implemented method of claim 9, wherein the calibrated video includes a tourist video clip with no position information or orientation information.

16. The one or more computer-readable storage devices of claim 11, wherein the propagating is done iteratively.

17. The one or more computer-readable storage devices of claim 11, wherein the semantic content comprises landmark information.

18. The one or more computer-readable storage devices of claim 11, wherein the semantic content comprises an anecdote.

19. The one or more computer-readable storage devices of claim 11, wherein at least one of the scheduling when and the duration in the calibrated video in which to display one or more annotations for the building is calculated using a dynamic programming algorithm.

\* \* \* \* \*